June 27, 1939.  F. TURRETTINI  2,164,129

MACHINE-TOOL SPINDLE

Filed June 16, 1938

F. Turrettini
Inventor
By: Glascock Downing Seebold
Attys.

Patented June 27, 1939

2,164,129

UNITED STATES PATENT OFFICE 2,164,129

MACHINE-TOOL SPINDLE

Fernand Turrettini, Bellevue-Geneva, Switzerland, assignor to the firm Societe Genevoise d'Instruments de Physique, Geneva, Switzerland, a firm of Switzerland Application June 16, 1938, Serial No. 214,121
In Switzerland March 31, 1938

4 Claims. (Cl. 308—63)

The present invention relates to tool or work spindles of milling, grinding, polishing and like machine-tools.

In usual tool spindles of such machine-tools, the nose of the spindle is situated at a certain distance from a thrust collar of the spindle, by means of which the spindle bears against the spindle housing. When the spindle rotates, it is heated and the portion of it situated between the nose and the thrust collar is subjected to an expansion which produces a displacement of the nose of the spindle and accordingly of the tool or of the work piece carried by the nose. This displacement, which can attain the order of one tenth of one millimeter and will vary during the operation of the spindle with the variations of temperature of the spindle bearings, can become extremely inconvenient, particularly when grinding profiled work, such as screw threads, and can produce deformation of the generated profile or loss of relative position between the work pieces and the tool in case of series work including a plurality of operations, as for example separate rough grinding and finishing of a thread. In order to avoid these inconveniences it has been necessary to let the spindle run idle for a certain time, to bring it to working temperature before starting actual grinding.

Spindle mountings have already been proposed which prevent a displacement of the tool owing to temperature rise, by making the nose of the spindle itself bear against a thrust bearing. But in this case the spindle and the thrust bearing have an annular contacting surface of large diameter which is difficult to obtain perfectly straight and perpendicular to the axis of the spindle, which is necessary in order to realize a perfectly true running of the tool. Furthermore, large thrust surfaces result in high surface speeds with corresponding temperature rise and rapid wear.

It has also been proposed to make the free end of the spindle nose bear against an axial abutment for preventing displacement of the tool owing to heat expansion. But in this case the replacement of the tool is difficult, since the axial abutment must be removed each time the tool has to be changed.

The object of the present invention is the provision of a tool spindle which avoids the above mentioned drawbacks and secures maximum advantages with regard to permanent correct tool position, accuracy of the thrust surfaces, and protection of these surfaces from being damaged by grit and cooling medium.

According to the invention the end of the spindle carrying the tool is provided with an internal thrust surface bearing against one end of a rod disposed according to the axis of the spindle and having its other end bearing against a portion of the spindle frame, the said rod consisting of material which is nonexpansible or has a small coefficient of thermal expansion. For example, this rod can be made of a metal alloy which is known as Invar.

In the accompanying drawing.

Figure 1:
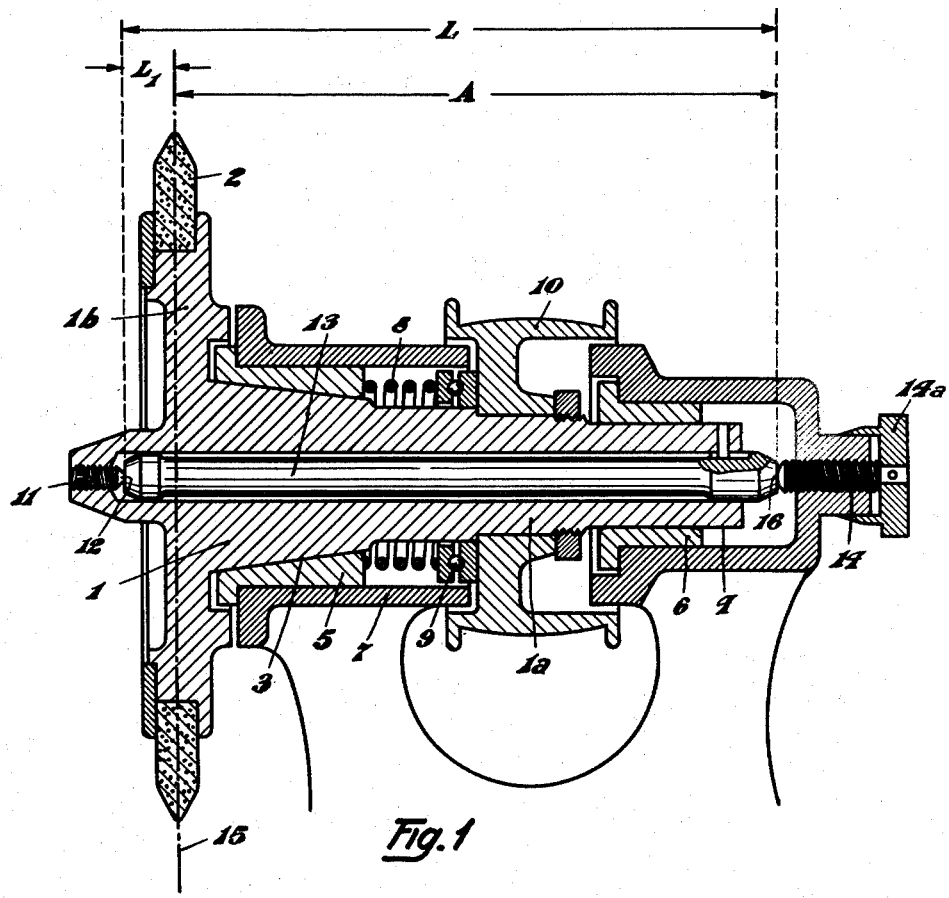
Figure 1 is an axial section of a tool spindle assembly of a grinding machine.

The spindle 1 comprises a body portion $1_a$ and a nose portion $1_b$ forming a disk which carries the grinding wheel 2. The spindle is provided with a conical journal 3 and with a cylindrical journal 4, the first one turning in a conical bushing 5 and the second one in a cylindrical bushing 6 mounted in the spindle bearing 7 of the headstick. A spring 8 is placed between the fixed bushing 5 and a thrust ball bearing 9 adjoining the driving pulley 10 secured to the spindle; this spring constantly tends to push the spindle towards the right in the figure. The nose of the spindle carries a screw 11 the inner end of which forms a small plane surface 12 which bears against the plane end of a rod 13 extending axially within the hollow spindle. The other end of the rod 13 bears against the end 16 of a micrometer screw 14 carried by the spindle bearing and forming a fixed abutment which is adjustable relative to the bearing. The rod 13 is made of material having a very small coefficient of thermal expansion, as for instance Invar.

Since the rod 13 is of nonexpansible, or very little expansible metal, it is evident that the position of the grinding wheel does not vary relatively to the abutment 16 carried by a fixed part of the machine. The grinding wheel accordingly has a constant position, independently of the temperature of the bushings 5 and 6 of the spindle 1.

It must however be noticed that the metals known as nonexpansible and generally constituted by ferrous alloys with about 36% of nickel, have a coefficient of thermal expansion which is not exactly zero. The actual coefficient can be positive or negative and reach a value of $1.10^{-6}$ up to $2.10^{-6}$ per degree centigrade; the coefficient of Invar is positive.

To take into account the small thermal expansion of the rod 13, its thrust face acting on the surface 12 of the screw 11 is not to be placed exactly in the medium plane of the wheel 2, but at a distance $L_1$ of same.

There is

L = length of the non expansible rod 13,
α = actual expansion coefficient of the rod 13,
t = mean temperature of the rod 13 over room temperature,
$L_1$ = distance between the thrust face 12 and the medium plane 15 of the wheel 2,
$α_1$ = thermal expansion coefficient of the hub $1_b$ of the wheel,
$t_1$ = mean temperature of the hub $1_b$ over room temperature,
A = distance between the medium plane 15 of the wheel and fixed thrust surface 16,
dA = variation of the distance A due to thermal expansion, which is obtained according to the equation:

$$dA = L \cdot t \cdot α - L_1 \cdot t_1 \cdot α_1$$

The sign − is valid for an arrangement according to the drawing and allows to bring dA down to zero when α is positive. The mean temperatures t and $t_1$ depending on the relative dimensions of the corresponding members and of the cooling conditions, these values will be determined by practical tests; these latter accordingly will fix the displacement $L_1$ which is required for obtaining perfect compensation.

Should the expansion coefficient of the rod 13 be small but negative, then the thrust face 12 must be located at the right of the medium plane 15 of the wheel, and the above formula will be written:

$$dA = L \cdot t \cdot α + L_1 \cdot t_1 \cdot α_1$$

In each case the coefficient α is to be introduced with its sign; for usual designs using steel spindles, the value of $α_1$ is about $11,5.10^{-6}$ per degree centigrade.

The portion of the spindle 1 adjacent the grinding wheel having an almost constant position relatively to the fixed parts of the machine, such as the bearings 5, 7, it is possible to form this bearing with a conical bore so as to be able to adjust the thickness of the lubricating oil film between the bearing surfaces by means of the micrometer screw 14 provided with a graduated drum 14a. This drum can carry a scale which directly indicates the thickness of the oil film. In this way, it is not necessary to provide a split bearing which is ordinarily used for spindles to adjust the play by its elastic deformation. The accuracy of guiding obtained with a rigid bearing as shown in the drawing is much better than with an elastic split bearing, because it is never possible to obtain a perfect fit between the spindle and a split bearing.

Figure 2:
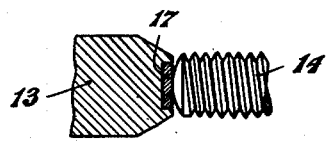
Figure 2 is a modification of a detail.

The end of the rod 13 bearing against the micrometer screw 14 can be formed by a piece of hard metal 17 such as tungsten carbide or chromium, as is shown in Fig. 2.

It is obvious that the same principle of invention can be applied to a grinding wheel journaled between two bearings instead of being overhung, as shown. Furthermore, the invention can not only be applied to tool spindles, but also to work carrying spindles, as for example in the case of a thread cutting lathe.

I claim:

1. A machine-tool spindle having a portion thereof remaining in a constant transverse plane irrespective of thermal expansion due to heating of the spindle when operating, said spindle having a spindle body provided with an axial bore, a bearing member for said spindle body, and a rod disposed within said bore, said rod consisting of substantially nonexpansible material, said bore being provided with a thrust surface disposed in proximity to said transverse plane and bearing against one end of said rod, the other end of the rod abutting against said bearing member.

2. A machine-tool spindle having a nose portion and a body portion, said spindle being provided with an axial bore, a bearing member for said body portion, a rod disposed within said bore, said rod consisting of substantially nonexpansible material, said bore being provided with a thrust surface situated in the region of the nose portion of the spindle and bearing against one end of said rod, and an adjustable abutment carried by said bearing member and bearing against the other end of said rod.

3. A machine-tool spindle as defined in claim 2, wherein the end of said rod bearing against the adjustable abutment is formed by a distinct piece of hard material.

4. A machine-tool spindle having a portion thereof remaining in a constant transverse plane irrespective of thermal expansion due to heating of the spindle during operation, said spindle being provided with a spindle body provided with an axial bore, a bearing member for said spindle body, a rod disposed within said bore, said rod consisting of substantially nonexpansible material, an axially adjustable thrust surface situated within said bore in proximity to said transverse plane and bearing against one end of said rod, and an axially adjustable abutment carried by said bearing member and bearing against the other end of said rod.

FERNAND TURRETTINI.